April 6, 1965
H. COUNTS
3,176,426
ANIMAL TRAPS
Filed Dec. 6, 1963
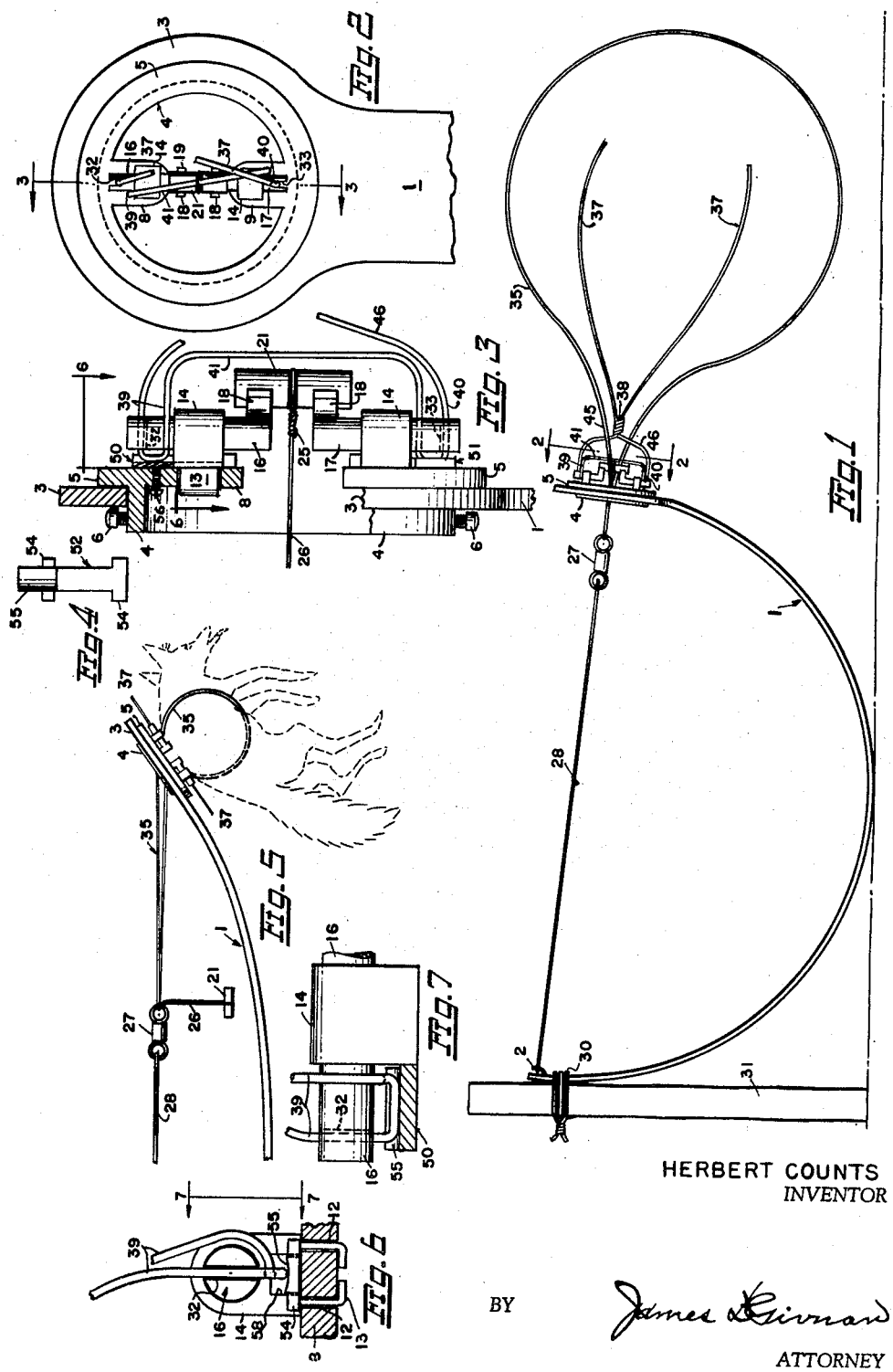
HERBERT COUNTS
INVENTOR
BY  *James Kirman*
ATTORNEY

United States Patent Office 3,176,426
Patented Apr. 6, 1965

3,176,426
ANIMAL TRAPS
Herbert Counts, 522 Idleyld Route, Roseburg, Oreg.
Filed Dec. 6, 1963, Ser. No. 328,751
2 Claims. (Cl. 43—87)

This invention relates to improvements in animal traps of the type shown and described in my United States Patent, No. 3,068,608, dated December 18, 1962.

It is one of the principal objects of the present invention to provide a trap of the character described which is of light weight, durable construction readily portable in quantities for distribution or placement along a trap line or at the entrance of underwater animal dens, and one which can be conveniently set and so positioned as to arrange trigger actuating means in any desired relationship to the ground, runway, or den entrance.

Another object is the provision of a trap of the character described whose trigger response may be regulated from a high degree of sensitivity for dealing with small animals to a slower or less sensitive trigger action for trapping animals of larger size or greater weight.

The trap is not bait-loaded but so designed so that it will instantaneously trap an animal touching the trip or trigger fingers while going along the ground or runway to a bait remotely disposed from the location of the trap.

The foregoing and other objects and advantages which will become subsequently apparent reside in the details of construction and operation as more fully hereinafter described and claimed, reference being had to the accompanying drawing forming a part hereof and in which:

FIGURE 1 is a side elevational view of a trap made in accordance with my invention arranged transversely of a runway and set to trap an animal.

FIGURE 2 is a fragmentary sectional end elevational view, on an enlarged scale, taken approximately along the line 2—2 of FIGURE 1.

FIGURE 3 is a fragmentary side elevational view with parts shown in section taken approximately along the line 3—3 of FIGURE 2.

FIGURE 4 is a detail plan view of a detent.

FIGURE 5 is a view similar to FIGURE 1 showing the trap in a sprung position.

FIGURE 6 is an enlarged sectional detail view taken approximately along the line 6—6 of FIGURE 3, and FIGURE 7 is a side elevational view taken approximately along the line 7—7 of FIGURE 6 with a portion shown in section.

With continuing reference to the drawing wherein like references of character designate like parts, and particularly FIGURES 1, 2 and 3 thereof, reference numeral 1 indicates generally the main body of the trap which comprises a length of spring steel provided with a hook 2 at one of its ends and enlarged into a circular portion 3 at its opposite end to receive a ring member 4 flanged as at 5 and rotatably maintained within the enlargement 3 by any suitable means such as pins, screws, bolts, or the like, indicated generally at 6 in FIGURE 3.

A pair of diametrically opposed inwardly extending lugs 8 and 9 are cast integrally with the ring member 4 and each is provided with two parallel slots 12 (see FIG. 6) for the reception of bendable legs or clips 13 carried by two diametrically opposed bearing blocks 14. The clips are bent inwardly toward each other and against the inside of the lugs 8 and 9 for securely mounting the bearing blocks thereto, as shown.

A pair of identical shafts 16 and 17 are rockably mounted within the bearing blocks 14 and each shaft is formed at its inner end with cradle-forming portions 18 and 19 to receive and temporarily hold a trigger bar 21 whose inner end is secured to the forward end of a swivel 27. The other end of the swivel is connected by a wire 28 to the hook 2 at the opposite end of the spring steel body 1 of the trap, and the body itself resting upon the ground adjacent an animal runway is secured as at 30 to a stake 31 driven into the ground.

The outer end of each shaft 16 and 17 is transversely slotted inwardly as at 32 and 33 respectively.

Also secured to the forward end of the swivel 27 is the inner or rearward end of a snare-wire looped as at 35 to a diameter such as that shown in the trap-set position in FIGURE 1.

The loop 35 when the trap is set surrounds a pair of trip-fingers 37 made from a single length of wire or rod twisted together as at 38, extending rearwardly therefrom and bent back into two end portions 39 and 40 and a cross-over 41.

One side of the end portion 39 which is identical with the opposite end 40 goes around one side of its respective cradle-shaft 16, outwardly along its respective detent 50, then back out through the slot 32 in the end of the cradle-shaft. The same applies to the relationship of the other end portion 40 to its cradle-shaft and detent 51. Joining the two trip-fingers, as at 38, insures synchronized operation of both so that an animal contacting either finger will cause simultaneous rotation of both cradle-shafts 16-17 and instantaneous release of the trigger bar 21 to spring the trap.

When the trap is set, with the loop 35 and trip-fingers 37 disposed vertically relative to the ground it will be readily apparent that an animal coming in contact with either or both trip-fingers and moving them to the right or to the left as viewed in FIGURE 2 will cause the ends 39 and 40 of those fingers to rock the shafts 16 and 17 sufficiently to release the trigger bar 21 from its cradle 18-19 to the snap-action of the now released spring steel body member 1, and such release will cause the circular end 3 of the body member and its related parts to spring out along loop 35 with a resultant tight encirclement of the loop about the body of the trapped animal, as shown in FIGURE 5.

It will also be apparent that if an animal strikes only the loop as shown in FIGURE 1 instead of the trip-fingers 37, movement of the loop to the right or to the left in the same manner as the trip-fingers will, by the rearward converging portions 45 of the loop coming in contact with the bridge 41 and/or that rearward portion 46 of the trip-fingers, also trip the trap just as effectively as if the animal had only made contact with the fingers 37.

For applying variable resistance to the rocking action of the shafts 16-17 and hence the release of the trigger bar 21 to spring the trap I provide at least one detent, indicated generally at 50, attached to one lug 8, or as at 51 to both lugs 8 and 9.

The detents are identical, and as shown in FIGURES 3, 6 and 7, each comprises an elongated plate 52 (see also FIG. 4) held between the lug and its respective bearing block 14 by the legs or clips 13 of the block when the block is secured to the lug as aforesaid. The plate is held against longitudinal displacement by ears 54 projecting laterally from both sides of the plate and disposed adjacent each end of the bearing block 14. The outer end portion of the plate is of concave formation as at 55 and backed by an adjusting screw 56.

As shown in the last mentioned figures, the bearing block is provided with a downwardly opening parallel-walled recess 58 throughout its length to accommodate movement of the plate 50 and hence its concave end 55 against the looped end 39 of the trigger-finger in accordance with the amount of advancement of the adjusting screw 56 on its threads and the resultant pressure against said looped end of the trigger-finger.

Thus it will be seen that the tripping sensitivity of the trap is widely variable to respond to the weight or thrust of animals ranging from the smallest to that of the largest within the capacity of the loop 35 when set.

Although I have thus far shown and described the loop 35 and trip-fingers 37 in a vertical plane relative to the ground or runway it will be readily understood that they may be positioned parallel to the ground or at any angle relative thereto because of the rotational mounting of their supporting ring 4 within the open circular end 3 of the main body 1. This rotational feature of the loop and its related parts is also highly advantageous in protecting the trap against the violent turning and twisting gyrations and somersaults of a trapped animal in fighting for his life to escape the trap.

While I have shown a particular form of embodiment of my invention, I am aware that many minor changes therein will readily suggest themselves to others skilled in the art without departing from the spirit and scope of the invention.

Having thus described my invention what I claim as new and desire to protect by Letters Patent is:

1. An animal trap comprising, an elongated spring steel main body member having an opening through one of its ends and adapted to be sprung into a spring bow, a ring member rotatably mounted within said opening, hook means carried by the opposite end of the body member, means securing said opposite end of the body member to a point of anchorage, a trigger bar cradle means rockably mounted transversely of said ring member and rotatable therewith relative to said opening, a trigger bar normally supported by said cradle means, means connecting said trigger bar at its center to said hook means for holding the trigger bar within said cradle and for setting the trap with said body member sprung to form a spring bow and thus holding said trigger bar on center relative to said cradle means, a loop of flexible wire having end portions positioned on opposite sides of said trigger bar and connected to said trigger bar-hook interconnecting means and extending through and outwardly from said ring member, and trip fingers attached at one of their ends to said trigger bar cradle means and having a portion extending between said end portions of said loop of flexible wire and portions extending into the space defined by said loop when the trap is set whereby movement of either the loop or the spring fingers in either direction by an animal coming into contact therewith will cause either the loop or the spring fingers to rock the cradle off center and thus release the trigger bar to the snap action of the now released spring body member causing said ring member and the end of said body member to spring out along the loop with a resultant tight trapping encirclement of the loop about the body of an animal within the loop.

2. An animal trap as claimed in claim 1 including, pressure responsive detent means in engagement with said trip fingers adjacent said attachment to said trigger bar cradle means, and manipulatory means for varying the pressure against the detent means to thereby regulate the sensitivity of trap operation.

References Cited by the Examiner
UNITED STATES PATENTS

| | | | |
|---|---|---|---|
| 872,429 | 12/07 | Johnson | 43—87 |
| 1,958,548 | 5/34 | Phillips | 43—87 |

SAMUEL KOREN, *Primary Examiner.*

ABRAHAM G. STONE, *Examiner.*